United States Patent
Kusama

(10) Patent No.: US 7,637,497 B2
(45) Date of Patent: Dec. 29, 2009

(54) INVERTING DOCUMENT FEEDING DEVICE WITH TRAY PRESSING MEMBER

(75) Inventor: Takuro Kusama, Aichi (JP)

(73) Assignee: Brother Kogyo Kabushiki Kaisha, Nagoya, Aichi (JP)

(*) Notice: Subject to any disclaimer, the term of this patent is extended or adjusted under 35 U.S.C. 154(b) by 0 days.

(21) Appl. No.: 12/393,076

(22) Filed: Feb. 26, 2009

(65) Prior Publication Data

US 2009/0218748 A1 Sep. 3, 2009

(30) Foreign Application Priority Data

Feb. 29, 2008 (JP) .............................. 2008-049453

(51) Int. Cl.
*B65H 29/00* (2006.01)
(52) U.S. Cl. ....................................... 271/186
(58) Field of Classification Search ................. 271/185, 271/186, 163; 399/374
See application file for complete search history.

(56) References Cited

U.S. PATENT DOCUMENTS

| | | | |
|---|---|---|---|
| 2006/0062615 A1* | 3/2006 | Horio | ........................... 399/374 |
| 2007/0020007 A1 | 1/2007 | Azuma | |
| 2007/0081212 A1 | 4/2007 | Tonami et al. | |
| 2008/0085141 A1 | 4/2008 | Lin et al. | |
| 2009/0074490 A1* | 3/2009 | Shoji et al. | ................... 399/374 |

FOREIGN PATENT DOCUMENTS

| | | |
|---|---|---|
| JP | 2002-211814 | 7/2002 |
| JP | 2006-232460 | 9/2006 |
| JP | 2006232460 A * | 9/2006 |

* cited by examiner

*Primary Examiner*—Patrick H Mackey
*Assistant Examiner*—Gerald W McClain
(74) *Attorney, Agent, or Firm*—Banner & Witcoff, Ltd.

(57) ABSTRACT

A document feeding device comprises an input tray, an output tray, a feeding mechanism for a feeding path, a turnover mechanism for a turnover path, ejection rollers, and an ejection mechanism. The ejection mechanism switches between a first ejection mode (for successively ejecting each document while stacking the document on documents previously ejected to the output tray) and a second ejection mode (for successively ejecting each document while sliding the document under the previously ejected documents) by relatively moving a nipping position of the ejection rollers and an upstream end of the output tray in the vertical direction. Also included are a pressing member which is pivotable up and down on the downstream side of the ejection rollers and which presses down the ejected documents in the first ejection mode, and a retracting mechanism which retracts the pressing member by pivoting the pressing member upward in the second ejection mode.

6 Claims, 8 Drawing Sheets

INVERTING DOCUMENT FEEDING DEVICE WITH TRAY PRESSING MEMBER

CROSS-REFERENCE TO RELATED APPLICATION

This application claims priority under 35 U.S.C. §119 from Japanese Patent Application No. 2008-049453 filed on Feb. 29, 2008. The entire subject matter of the application is incorporated herein by reference.

BACKGROUND

1. Technical Field

The aspects of the present invention relate to a document feeding device for feeding a document from a document input tray to a document output tray via a scanning position of a document scanner.

2. Prior Art

Among document feeding devices in which a document feeding unit is placed in an upper part and a document ejection unit is placed in a lower part, there exists a known device in which a pressing plate for pressing down curl of documents (already ejected to the document output tray) is placed at the base of the document feeding unit (in the upper part) so that documents can be normally stacked up on the document output tray in the order of ejection even when there is curl at the front end or rear end of the already ejected documents in the feeding direction (see Japanese Patent Provisional Publication No. 2002-211814 (FIG. 1), for example).

SUMMARY OF THE INVENTION

However, the above conventional technique has taken into consideration only a configuration for ejecting each document while stacking it on the already ejected documents. There also exists a known configuration which ejects each document while sliding it under the already ejected documents. In this case, if the already ejected documents (especially, the rear end of the documents) are pressed down, the sliding of each document under the already ejected documents becomes difficult and document ejection performance of the document feeding device is deteriorated.

In consideration of the above problem, aspects of the present invention are advantageous in that a document feeding device having a new configuration and being capable of preventing the deterioration of the document ejection performance can be provided.

In accordance with an aspect of the present invention, there is provided a document feeding device for feeding documents, comprising a document input tray on which documents to be fed are placed, a document output tray to which the documents are ejected, a feeding mechanism which is provided for a feeding path connecting the document input tray and the document output tray via a scanning position and feeds each document from the document input tray to the scanning position and from the scanning position to the document output tray, a turnover mechanism which is provided for a turnover path connected to the feeding path and returns the document after passing through the scanning position to a position on the upstream side of the scanning position while interchanging the front end and the rear end of the document in a feeding direction, a pair of ejection rollers which ejects the documents to the document output tray, an ejection mechanism which switches its document ejection mode between a first ejection mode for successively ejecting each document while stacking it on documents already ejected to the document output tray and a second ejection mode for successively ejecting each document while sliding it under the documents already ejected to the document output tray by relatively moving a nipping position of the pair of ejection rollers and an upstream end position of the document output tray regarding a feeding direction in a vertical direction, a pressing member which is provided to be pivotable up and down on the downstream side of the pair of ejection rollers regarding the feeding direction and which presses down the already ejected documents on the document output tray from above in the first ejection mode, and a retracting mechanism which retracts the pressing member by pivoting it upward in the second ejection mode.

In the document feeding device configured as above, the pressing member presses down the already ejected documents on the document output tray from above in the first ejection mode, while the retracting mechanism retracts the pressing member by pivoting it upward in the second ejection mode. Therefore, the documents ejected can consistently be stacked up on the document output tray in the order of ejection (thanks to the pressing member) in the first ejection mode, while preventing the pressing member from hampering smooth sliding of each document under the already ejected documents in the second ejection mode.

In conventional document feeding devices capable of switching the document ejection mode between the first ejection mode (successively stacking each document on the already ejected documents) and the second ejection mode (successively sliding each document under the already ejected documents), the use of the aforementioned pressing plate (conventional technique) deteriorates the document ejection performance in the second ejection mode in which the sliding of each document under the already ejected documents is necessary. On the other hand, if the pressing plate is not used, the document ejection performance in the first ejection mode (successively stacking up the documents) is deteriorated since a document ejected can slide into or under the stack of already ejected documents when there is curl in the stack.

With the document feeding device in accordance with the above configuration, each document can consistently be stacked on the already ejected documents in the first ejection mode, while realizing smooth sliding of each document under the already ejected documents in the second ejection mode. Therefore, a document feeding device, having a new configuration and being capable of switching the document ejection mode between the first ejection mode and the second ejection mode without deteriorating the document ejection performance, can be provided.

In the document feeding device configured as above, the pressing member is set in the above state (in which the pressing member can press down the already ejected documents from above) by the control unit by controlling the retracting mechanism when the use of the turnover mechanism (e.g. for the first ejection mode in the double-side scan) is selected through the selection unit, by which the stack of documents on the document output tray can be securely pressed down with the pressing member when the turnover mechanism is used. Incidentally, if the documents stacked up on the document output tray are not pressed down by the pressing member, the height of the document stack increases since the documents are stacked up via layers of air, by which a document during a switchback operation of the turnover mechanism can make contact with or slide into the document stack on the document output tray. In this case, the document during the switchback operation can be bent or folded (due to a load added thereto) and finally jammed between rollers. Further, also when the document stack not pressed down by the pressing member has curl at its rear end, the rear end can make contact with the document during the switchback operation, by which the document can be bent, folded and jammed. Such problems are prevented and the switchback operation is carried out smoothly and excellently in the document feeding device configured as above (in which the pressing member presses down the document stack when the switchback operation is carried out, that is, when the turnover mechanism is used).

Other objects, features and advantages of the aspects of the present invention will become more apparent from the consideration of the following detailed description taken in conjunction with the accompanying drawings.

BRIEF DESCRIPTION OF THE ACCOMPANYING DRAWINGS

DETAILED DESCRIPTION OF THE EMBODIMENT

Figure 1:
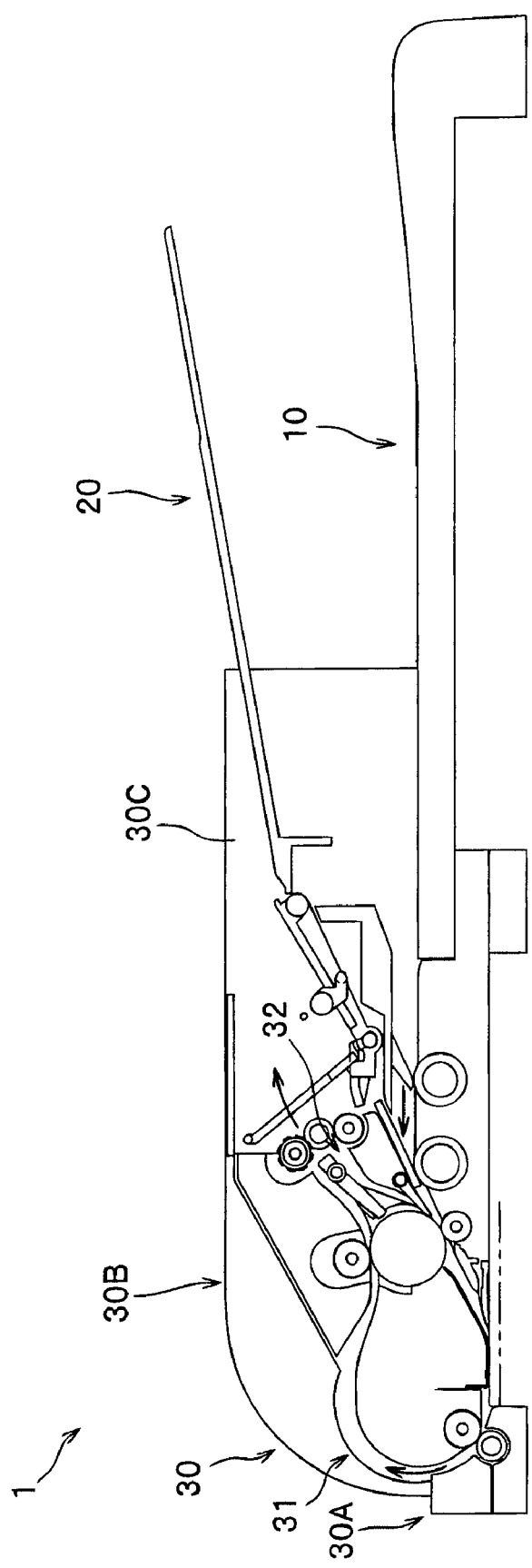
FIG. 1 is a cross-sectional view showing the overall configuration of a document feeding device in accordance with an embodiment of aspects of the present invention.

Referring now to the drawings, a description will be given in detail of a preferred embodiment in accordance with aspects of the present invention.

<Overall Configuration of Document Feeding Device>

Figure 2:
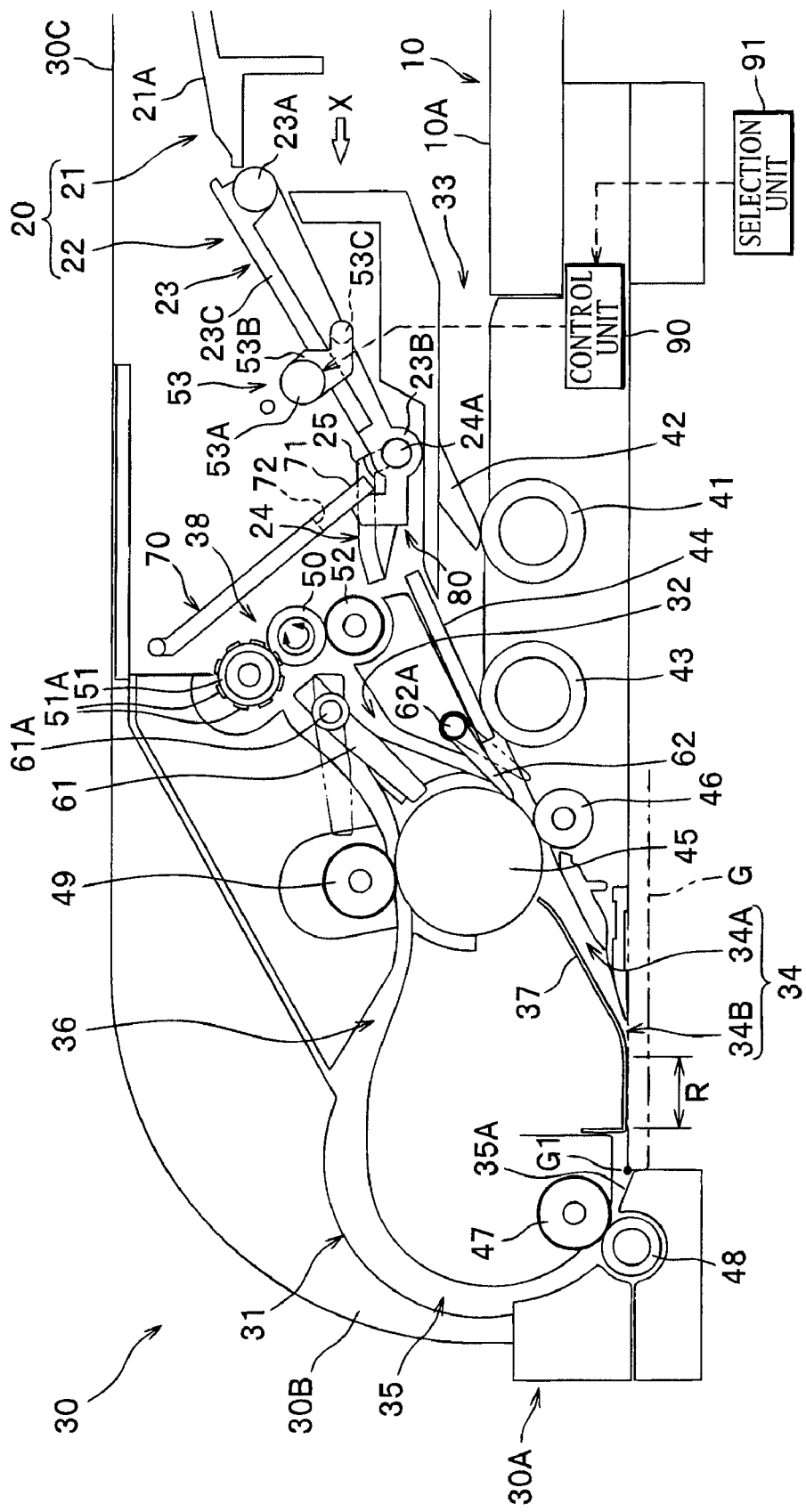
FIG. 2 is a cross-sectional view showing the configuration of a document feeding unit of the document feeding device.

FIG. 1 is a cross-sectional view showing the overall configuration of a document feeding device in accordance with an embodiment of the aspects of the present invention. FIG. 2 is a cross-sectional view showing the configuration of a document feeding unit of the document feeding device.

As shown in FIG. 1, the document feeding device 1 of this embodiment mainly includes a document input tray 10, a document output tray 20 and a document feeding unit 30.

The document input tray 10, as a part on which documents to be scanned (i.e. documents to be fed) are placed, is situated in a lower right part of the document feeding device 1 in FIG. 1.

The document output tray 20, as a part on which the documents after being scanned (i.e. after being ejected from the document feeding unit 30) are stacked, is situated above the document input tray 10. The detailed configuration of the document output tray 20 will be described later.

The document feeding unit 30, as a unit for feeding the document from the document input tray 10 to the document output tray 20, is situated to the left of the document input tray 10 and the document output tray 20 in FIG. 1. An outer frame of the document feeding unit 30 includes a body frame 30A and a cover 30B which is rotatable with respect to the body frame 30A around an axis in a lower left part in FIG. 1. A feeding path 31 and a turnover path 32 for feeding the document are formed mainly by the body frame 30A and the cover 30B. In the document feeding unit 30, the feeding path 31 is equipped with a feeding mechanism (explained later) and a part of an ejection mechanism (explained later), while the turnover path 32 is equipped with a turnover mechanism (explained later).

In the following explanation, the traveling direction of the document being fed from the document input tray 10 to the document output tray 20 through the feeding path 31 (indicated by arrows in FIG. 1) will be referred to as a "feeding direction". Expressions "upstream side" and "downstream side" in the following explanation mean "upstream side in the feeding direction" and "downstream side in the feeding direction", respectively.

<Configuration of Feeding Path and Turnover Path>

As shown in FIG. 2, the feeding path 31 (formed substantially in a U-shape) is a path connecting the document input tray 10 and the document output tray 20 via a scanning position R. The feeding path 31 is made up of an intake path 33, a lower feeding path 34, a curved path 35 and an upper feeding path 36.

The intake path 33 continuously extends from a loading surface 10A of the document input tray 10 toward the downstream side substantially in a horizontal direction. In the intake path 33, a guide surface is formed by the body frame 30A.

The lower feeding path 34 includes a sloped part 34A extending from the downstream end of the intake path 33 toward the lower left in FIG. 2 and a horizontal part 34B extending downstream substantially in a horizontal direction from the downstream end of the sloped part 34A. In the lower feeding path 34, a lower guide surface of the sloped part 34A is formed by the body frame 30A, while an upper guide surface of the sloped part 34A and the horizontal part 34B is formed by a document guide 37. The bottom of the horizontal part 34B is open (as the scanning position R) so as to expose the document for the scanning.

The document guide 37 mainly includes a sloped part and a horizontal part corresponding to the sloped part 34A and the horizontal part 34B of the lower feeding path 34. The horizontal part of the document guide 37 holds down the document being exposed at the scanning position R. Incidentally, in cases where the document feeding device 1 is used with (installed in) a copier, MFP (Multi-Function Peripheral), etc., platen glass G of a document scanner (unshown) of a well-known type is provided under the horizontal part of the document guide 37. The document fed to the scanning position R through the horizontal part 34B while being sandwiched between the document guide 37 and the platen glass G is scanned by an unshown document scanning unit (e.g. image sensor) placed beneath the platen glass G.

The curved path 35, extending upward like an arc from the downstream end of the lower feeding path 34 (horizontal part 34B), changes the feeding direction by approximately 180 degrees (leftward to rightward in FIG. 2). In the curved path 35, a guide surface is formed by the body frame 30A and the cover 30B. Although not illustrated, a part of the curved path 35 can be exposed by rotating and opening the cover 30B, through which a document jammed in the feeding path 31 can be removed.

Incidentally, a guide surface 35A, sloping from a position under the upper edge of the downstream end of the platen glass G toward a nipping position of a second feeding roller 47 and a pinch roller 48 (explained later), is formed at the bottom of the curved path 35 at its upstream end, by which the document being fed on the platen glass G is smoothly fed to the curved path 35 without getting snagged.

The upper feeding path 36 extends from the downstream end of the curved path 35 toward the document output tray 20. In the upper feeding path 36, an upper guide surface is formed by the body frame 30A, while a lower guide surface is formed by the body frame 30A and a first guide member 61 which will be explained later. The downstream end of the upper feeding path 36 serves as a document outlet 38.

The turnover path 32 extends from the document outlet 38 toward the lower left in FIG. 2 to connect to the upstream end of the lower feeding path 34 (sloped part 34A). In the turnover path 32, guide surfaces are formed by the body frame 30A, the first guide member 61 (explained later) and a second guide member 62 (explained later).

<Configuration of Feeding Mechanism>

The feeding path 31 is equipped with the feeding mechanism, which feeds the document from the document input tray 10 to the scanning position R, and to the document output tray 20. In this embodiment, the feeding mechanism is mainly composed of an intake roller 41, an intake pad 42, a separation roller 43, a separation pad 44, a first feeding roller 45, the second feeding roller 47, a switchback roller 50 and pinch rollers 46, 48, 49 and 51.

The intake roller 41, for pulling the documents placed on the document input tray 10 toward the separation roller 43, is situated to expose its top from the bottom of the intake path 33 at a position near the midpoint of the intake path 33. The intake roller 41 is driven and rotated by driving force transmitted from an unshown motor.

The intake pad 42, for pressing the documents against the intake roller 41 to let the intake roller 41 pull the documents steadily, is situated to face the intake roller 41 from above. The intake pad 42, capable of pivoting up and down, is constantly biased toward the intake roller 41.

The separation roller 43, for sending out the documents one by one, is situated to expose its top from the bottom of the intake path 33 at the downstream end of the intake path 33. The separation roller 43 is driven and rotated by driving force transmitted from the unshown motor.

The separation pad 44, for pressing the documents against the separation roller 43 to let the separation roller 43 separate and send out a document with reliability, is situated to face the separation roller 43 from above. The separation pad 44, capable of pivoting up and down, is constantly biased toward the separation roller 43.

The first feeding roller 45, for feeding the document inside the feeding path 31, is situated to expose its bottom from the top of the lower feeding path 34 (sloped part 34A) at a position near the midpoint of the sloped part 34A while exposing its top from the bottom of the upper feeding path 36 at a position near the midpoint of the upper feeding path 36. The first feeding roller 45 is driven and rotated by driving force transmitted from the unshown motor.

The pinch roller 46 is situated at a position near the midpoint of the sloped part 34A, with its top (exposed from the bottom of the sloped part 34A) contacting the first feeding roller 45.

The second feeding roller 47, for feeding the document from the scanning position R toward the document output tray 20, is situated to expose its bottom from the top of the curved path 35 at a position near the upstream end of the curved path 35. The second feeding roller 47 is driven and rotated by driving force transmitted from the unshown motor.

The pinch roller 48 is situated at a position near the upstream end of the curved path 35, with its top (exposed from the bottom of the curved path 35) contacting the second feeding roller 47.

The pinch roller 49 is situated at a position near the midpoint of the upper feeding path 36, with its bottom (exposed from the top of the upper feeding path 36) contacting the first feeding roller 45.

The switchback roller 50, for ejecting the document to the document output tray 20, is situated at the document outlet 38. The switchback roller 50 is driven and rotated by driving force transmitted from the unshown motor. Incidentally, the switchback roller 50 forms a part of the turnover mechanism (explained later) and the ejection mechanism (explained later).

The pinch roller 51 is situated at the document outlet 38 to contact the switchback roller 50 from above. At both ends of the pinch roller 51 in its axial direction, a plurality of projections 5 1A, for pushing out the document (to be ejected) by making contact with the rear end of the document in the feeding direction, are formed around the periphery of the pinch roller 51.

Since the pinch rollers 46, 48, 49 and 51 are biased by unshown biasing members toward the corresponding rollers 45, 47, 45 and 50, respectively, the document can be pressed against the rollers 45, 47 and 50, by which the document can be fed with reliability.

<Configuration of Turnover Mechanism>

The turnover path 32 is equipped with the turnover mechanism. The turnover mechanism returns the document from the document outlet 38 to a position on the upstream side of the scanning position R (specifically, to a position on the upstream side of the lower feeding path 34 (sloped part 34A) while interchanging the front end and the rear end of the document in the feeding direction (and turning over the document). In this embodiment, the turnover mechanism is mainly composed of the first guide member 61, the second guide member 62, the switchback roller 50 and a pinch roller 52.

The first guide member 61, which is situated at a position near the document outlet 38 and on the upstream side of the switchback roller 50, is capable of pivoting up and down around a pivot shaft 61A. When the document turnover is not carried out, the first guide member 61 stays downward (as indicated with solid lines in FIG. 2) and thereby guides the document toward a nipping position of the switchback roller 50 and the pinch roller 51. In this state, the first guide member 61 forms a part of the lower guide surface of the upper feeding path 36.

On the other hand, when the document turnover is carried out, the first guide member 61 first pivots upward (as indicated with chain lines in FIG. 2) to change the course of the upper feeding path 36, and thereby guides the document toward a nipping position of the switchback roller 50 and the pinch roller 52. After the whole document has entered the turnover path 32, the first guide member 61 pivots downward (as indicated with solid lines in FIG. 2) to form a part of the guide surface of the turnover path 32.

The second guide member 62, which is situated at the intersection of the turnover path 32 and the feeding path 31 (lower feeding path 34), is capable of pivoting up and down around a pivot shaft 62A. When the document turnover is carried out, the second guide member 62 pivots downward (as indicated with chain lines in FIG. 2) and thereby connects the turnover path 32 to the lower feeding path 34. In this state, the second guide member 62 forms a part of the guide surface of the turnover path 32. When the document turnover is not carried out, the second guide member 62 stays upward (as indicated with solid lines in FIG. 2) to connect the intake path 33 to the lower feeding path 34.

The switchback roller 50 is controlled by a well-known control method so that its rotational direction can be changed. When the document turnover is carried out, the switchback roller 50 is driven and rotated counterclockwise in FIG. 2 so as to temporarily feed the document (sandwiched between the switchback roller 50 and the pinch roller 52) toward the outside. Before the document is totally ejected, the rotation of the switchback roller 50 is stopped according to the well-known control method. Then, the switchback roller 50 is driven and rotated clockwise in FIG. 2 so as to pull in the document sandwiched between the switchback roller 50 and the pinch roller 52. In this state (with the first guide member 61 staying downward as indicated with solid lines in FIG. 2), the document pulled in is guided to the turnover path 32 along the lower surface of the first guide member 61.

The pinch roller 52 is situated in a lower part of the document outlet 38 to contact the switchback roller 50 from below. The pinch roller 52, which is also biased toward the switchback roller 50 similarly to the pinch roller 51 on the other side, is capable of pressing the document against the switchback roller 50, by which the document can be fed steadily.

<Operation of Document Feeding Unit>

Figure 3:
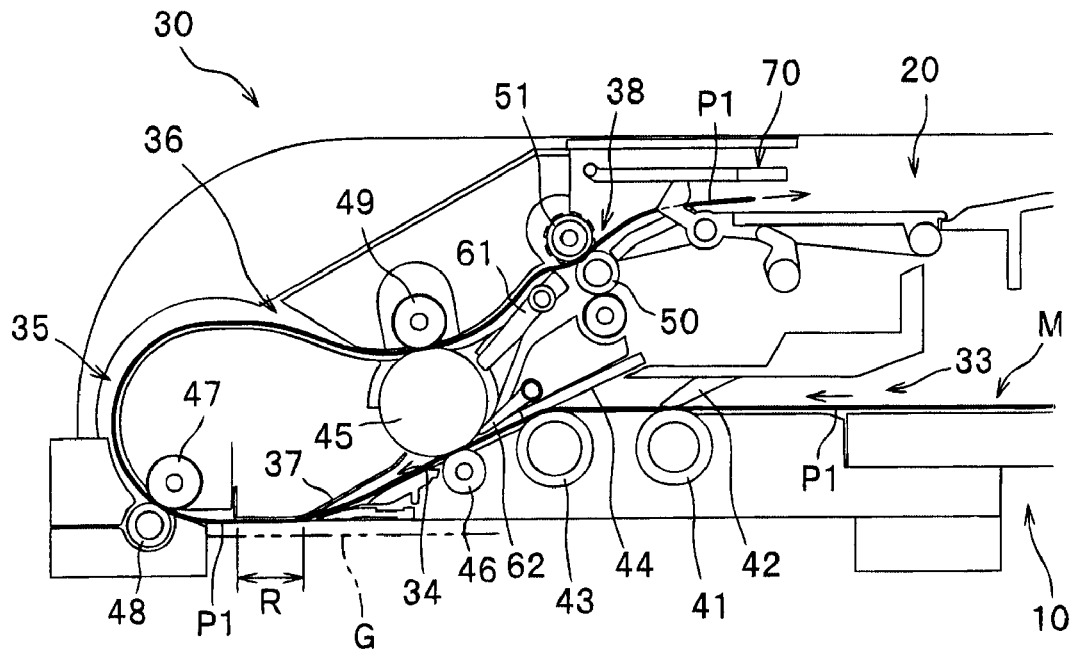
FIG. 3 is a cross-sectional view showing the operation of the document feeding unit for the single-side scan.
Figure 4:
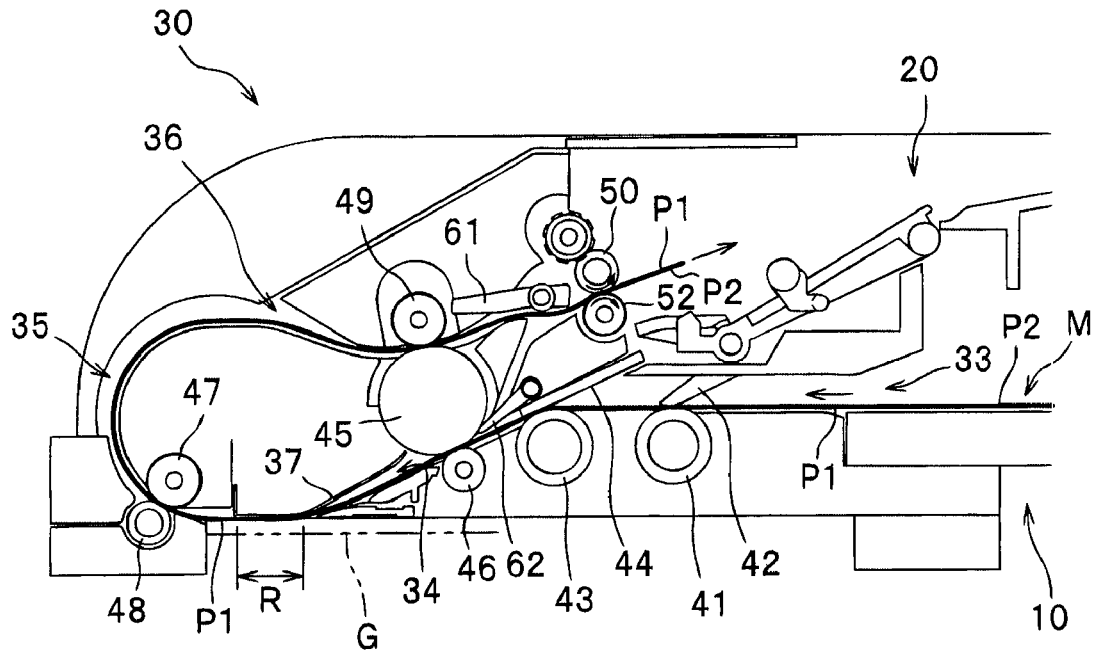
FIG. 4 is a cross-sectional view showing the operation of the document feeding unit for the double-side scan.
Figure 5:
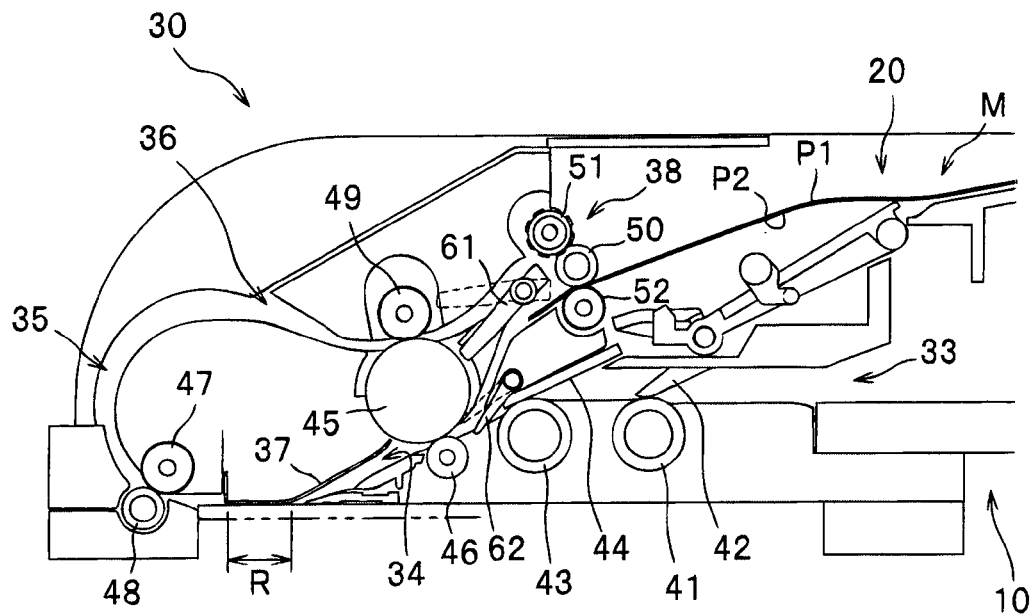
FIG. 5 is a cross-sectional view showing the operation of the document feeding unit for the double-side scan.
Figure 6:
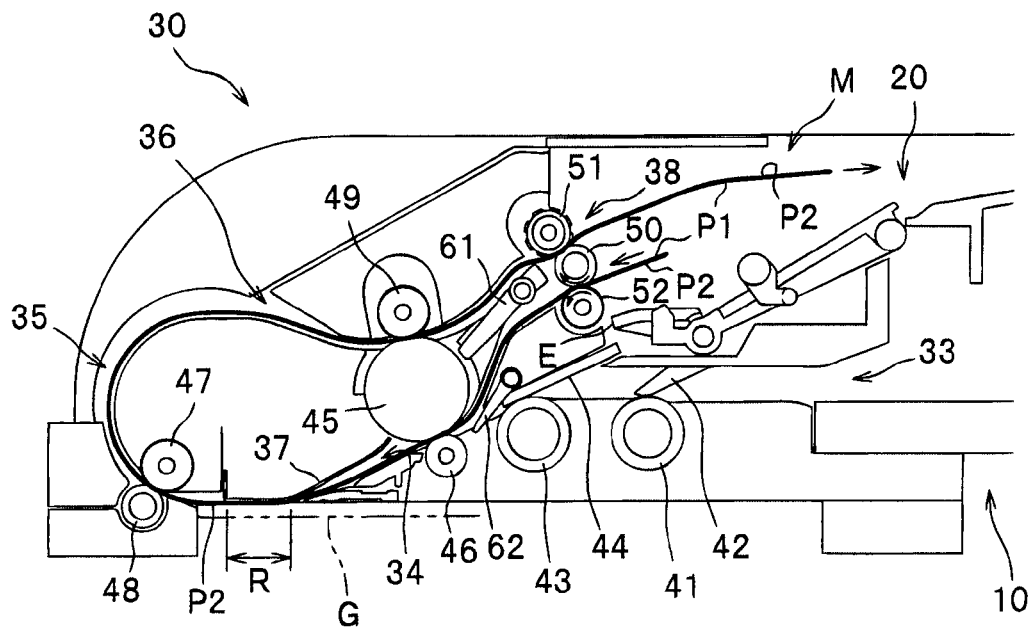
FIG. 6 is a cross-sectional view showing the operation of the document feeding unit for the double-side scan.

Here, the operation of the document feeding unit 30 configured as above will be described. FIG. 3 is a cross-sectional view showing the operation of the document feeding unit 30 for the single-side scan. FIGS. 4-6 are cross-sectional views showing the operation of the document feeding unit 30 for the double-side scan. Incidentally, pressing members 70 (explained later) are not shown in FIGS. 4-6 for convenience of explanation.

(Single-Side Scan)

In the single-side scan, the first guide member 61 stays at the lower position and the second guide member 62 stays at the upper position as shown in FIG. 3. A document M placed on the document input tray 10 with its scan target surface P1 facing downward is pulled toward the separation roller 43 by the intake roller 41 and the intake pad 42 and then fed to the lower feeding path 34 by the separation roller 43 and the separation pad 44.

The document M in the lower feeding path 34 is fed by the first feeding roller 45 and the pinch roller 46 to the scanning position R with its scan target surface P1 facing downward. At the scanning position R, the scan target surface P1 of the document M is scanned by a well-known document scanner. Thereafter, the document M is fed through the curved path 35 and the upper feeding path 36 by the rollers 47, 48, 45 and 49 and then ejected through the document outlet 38 by the switchback roller 50 and the pinch roller 51.

Since the document M is ejected with its scan target surface P1 facing upward in this case (single-side scan), the scan target surfaces P1 of already ejected documents (if any) are also facing upward. Therefore, the documents ejected can be arranged in the normal order by successively ejecting each document M while sliding it under the already ejected documents. The ejection mechanism for sliding each document M under the already ejected documents will be described later.

(Double-Side Scan)

In the double-side scan, the first guide member 61 and the second guide member 62 first stay at the upper positions as shown in FIG. 4. A document M placed on the document input tray 10 with its front scan target surface P1 facing downward and its back scan target surface P2 facing upward is fed to the lower feeding path 34 by the rollers 41 and 43 and the pads 42 and 44.

The document M in the lower feeding path 34 is fed by the first feeding roller 45 and the pinch roller 46 to the scanning position R with its front scan target surface P1 facing downward, at which the front scan target surface P1 of the document M is scanned. Thereafter, the document M is fed through the curved path 35 and the upper feeding path 36 by the rollers 47, 48, 45 and 49, guided under the first guide member 61, and fed toward the outside by the switchback roller 50 and the pinch roller 52.

By stopping the switchback roller 50 (by the well-known control method) before the document M is totally ejected by the switchback roller 50 and the pinch roller 52, the document M barely remains inside with its rear end sandwiched between the switchback roller 50 and the pinch roller 52 as shown in FIG. 5. Then, by pivoting both the first guide member 61 and the second guide member 62 downward, the turnover path 32 is formed and connected to the lower feeding path 34. In this state, the front scan target surface P1 and the back scan target surface P2 of the document M are facing upward and downward, respectively.

By reversing the rotational direction of the switchback roller 50 as shown in FIG. 6, the document M is pulled into the turnover path 32 by the switchback roller 50 and the pinch roller 52 and is fed to the upstream part of the lower feeding path 34 (on the upstream side of the scanning position R). Then, the document M is fed by the first feeding roller 45 and the pinch roller 46 to the scanning position R with its back scan target surface P2 facing downward, at which the back scan target surface P2 of the document M is scanned. Thereafter, the document M is fed through the curved path 35 and the upper feeding path 36 by the rollers 47, 48, 45 and 49 and then ejected through the document outlet 38 by the switchback roller 50 and the pinch roller 51.

Since the document M is ejected with its back scan target surface P2 facing upward in this case (double-side scan), the back scan target surfaces P2 of already ejected documents (if any) are also facing upward. Therefore, the documents ejected can be arranged in the normal order by successively ejecting each document M while stacking it on the already ejected documents. In cases where the upstream end E of the document output tray 20 is situated above the nipping position of the switchback roller 50 and the pinch roller 51 as shown in FIG. 6, the document M can be stacked on the already ejected documents by just ejecting the document M, by which the documents ejected can be arranged in the normal order.

<Configuration around Ejection Mechanism>

Figure 7:
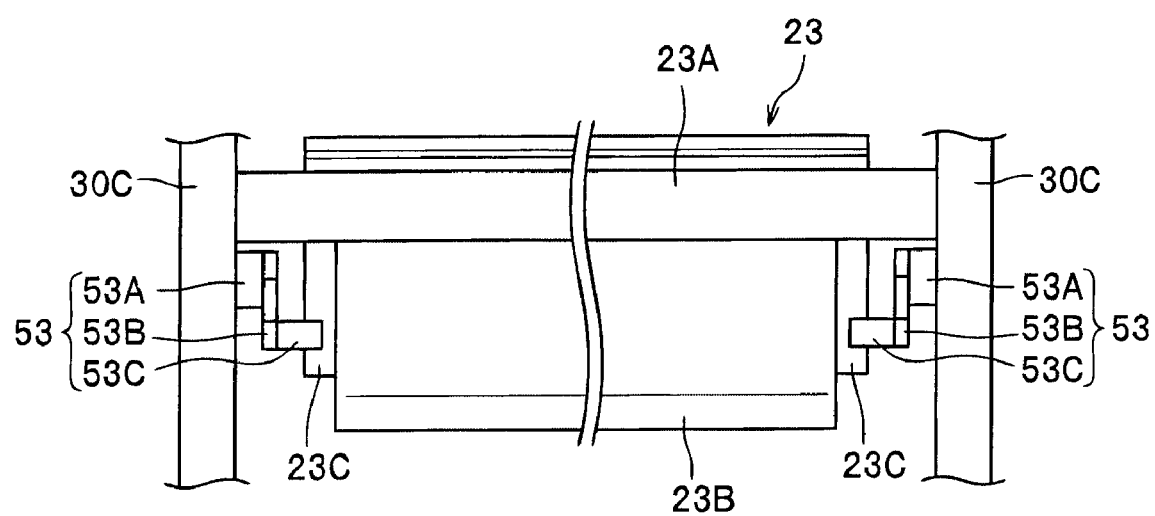
FIG. 7 is a schematic diagram showing a flap part and cams of an ejection mechanism of the document feeding device viewed in the direction of arrow X in FIG. 2.
Figure 8:
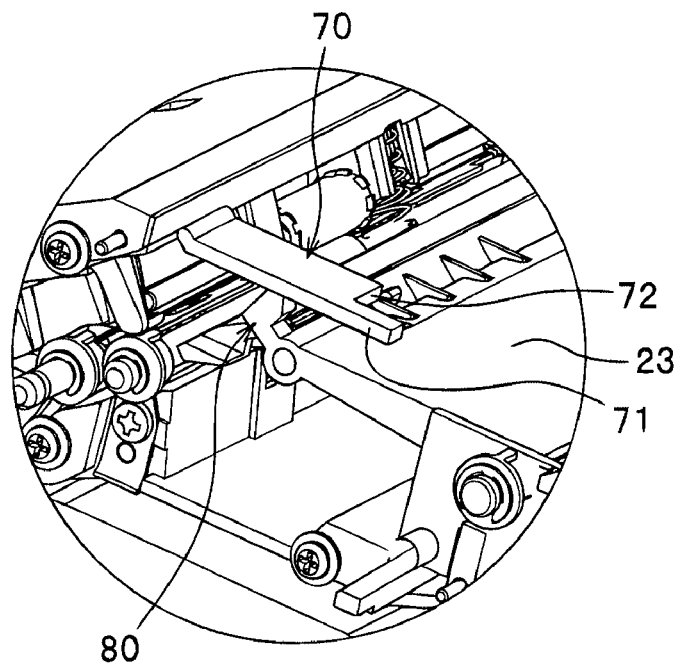
FIG. 8 is a perspective view showing a pressing member and a retracting member of the document feeding device.

Next, the configuration around the ejection mechanism (a feature of this embodiment) will be described. FIG. 7 is a schematic diagram showing a flap part and cams of the ejection mechanism viewed in the direction of arrow X in FIG. 2. FIG. 8 is a perspective view showing a pressing member and a retracting member of the document feeding device 1.

In the following explanation, the direction orthogonal to the sheet of FIG. 2, that is, the width direction of the document (orthogonal to the feeding direction) will be referred to simply as a "width direction".

As shown in FIG. 2, the ejection mechanism is mainly composed of the document output tray 20, the switchback roller 50 and the pinch roller 51 (as an example of a pair of ejection rollers), and cams 53 (as an example of a switching drive mechanism). Pressing members 70, for pressing down a rear end part of the (one or more) documents M placed (stacked) on the document output tray 20, are provided over the upstream end of the document output tray 20.

The document output tray 20 is mainly composed of a tray part 21 and a flap part 22 situated on the upstream side of the tray part 21.

The tray part 21 is situated over the document input tray 10, with its both edges regarding the width direction fixed to side panels 30C. The upper surface of the tray part 21 serves as a stacking surface 21A on which the documents ejected are stacked up. The side panels 30C, which are placed on both sides of the tray part 21 in the width direction integrally with the body frame 30A, are panel-like members forming the outer frame (housing) of the document feeding device 1 together with the body frame 30A and the cover 30B (see FIG. 1, in which only one side panel 30C is shown).

The flap part 22 includes a first flap 23 and a second flap 24.

The first flap 23 is attached to the tray part 21 to be capable of pivoting up and down around a pivot shaft 23A at its downstream end. The first flap 23 has a shaft bearing part 23B at its upstream end. In upper parts of side faces of the first flap 23 on both sides in the width direction, contacting parts 23C (with which the cams 53 (push-up parts 53C) which will be explained later make contact, respectively) are formed to protrude outward in the width direction (see FIG. 7). Further, L-shaped retracting members 80 (projecting toward the upstream side and then bending upward) are formed integrally with the shaft bearing part 23B.

The retracting members 80 are members for pushing up the pressing members 70 when the flap part 22 pivots upward around the pivot shaft 23A. Specifically, the retracting members 80 are placed on both sides of the first flap 23 in the width direction (outside the width of the document M) as shown in FIG. 8 (in which only one retracting member 80 on one side is shown). The apical surface of each retracting member 80 is formed in a mountain shape with its approximate center (between its upstream end and downstream end) projecting most toward each pressing member 70. A slope of the apical surface on the upstream side is formed to be capable of firmly supporting the pressing member 70 placed at its retracted position (upper position).

The pressing members 70 are also placed on both sides of the document M in the width direction (corresponding to the pair of retracting members 80). The pressing members 70 are attached to the housing of the document feeding device 1 (e.g. side panels 30C) to be pivotable up and down on the downstream side of the switchback roller 50. At the distal end of each pressing member 70, a pushed part 71 (to be pushed up by the corresponding retracting member 80) and a document contacting part 72 (situated on the pivot shaft side of the pushed part 71 and formed by cutting off a part of the pressing member 70) are formed. The pushed part 71 of each pressing member 70 is situated outside the flap part 22 in the width direction to be capable of making contact with the retracting member 80 in the state of FIG. 2. The document contacting part 72 of each pressing member 70 is placed to face the upper surface of the document output tray 20 in the state of FIG. 2.

The second flap 24 is situated on the upstream side of the first flap 23. The second flap 24 is attached to the first flap 23 to be capable of pivoting around a pivot shaft 24A which is borne by the shaft bearing part 23B of the first flap 23. The second flap 24, having a bent part 25 bending downward on the downstream side, is shaped like an "L" overall. In a state in which the first flap 23 has pivoted downward as in FIG. 2, the second flap 24 keeps its upper surface in a substantially level position by properly engaging with the side panels 30C, for example. In this state, the upper surface of the flap part 22 is situated below the nipping position of the switchback roller 50 and the pinch roller 51, and thus the documents ejected by the switchback roller 50 and the pinch roller 51 are successively stacked up on the document output tray 20. In other words, in the state in which the first flap 23 has pivoted downward, the documents are ejected in a first ejection mode for ejecting each document while successively stacking it on documents already ejected to the document output tray 20.

On the other hand, in a state in which the first flap 23 has pivoted upward (see FIG. 11), the second flap 24 keeps being pivoted (tilted) downward (with its upper surface descending in the upstream direction) with respect to the first flap 23. In this state, the downward rotation (pivoting) of the second flap 24 is restricted at a prescribed position due to contact of parts (unshown) of the second flap 24 with parts (unshown) of the first flap 23. Since the upper surface of the flap part 22 is situated above the nipping position of the switchback roller 50 and the pinch roller 51 in this state, each document ejected by the switchback roller 50 and the pinch roller 51 slides under the documents already ejected to (stacked on) the document output tray 20. In other words, in the state in which the first flap 23 has pivoted upward, the documents are ejected in a second ejection mode for ejecting each document while successively sliding it under the documents already ejected to the document output tray 20.

In the first ejection mode, most of each retracting member 80 sinks below the upper surface of the second flap 24 as shown in FIG. 2 due to upward pivoting of the second flap 24 with respect to the first flap 23 (with the upper surface of the second flap 24 placed in the substantially level position).

Figure 11:
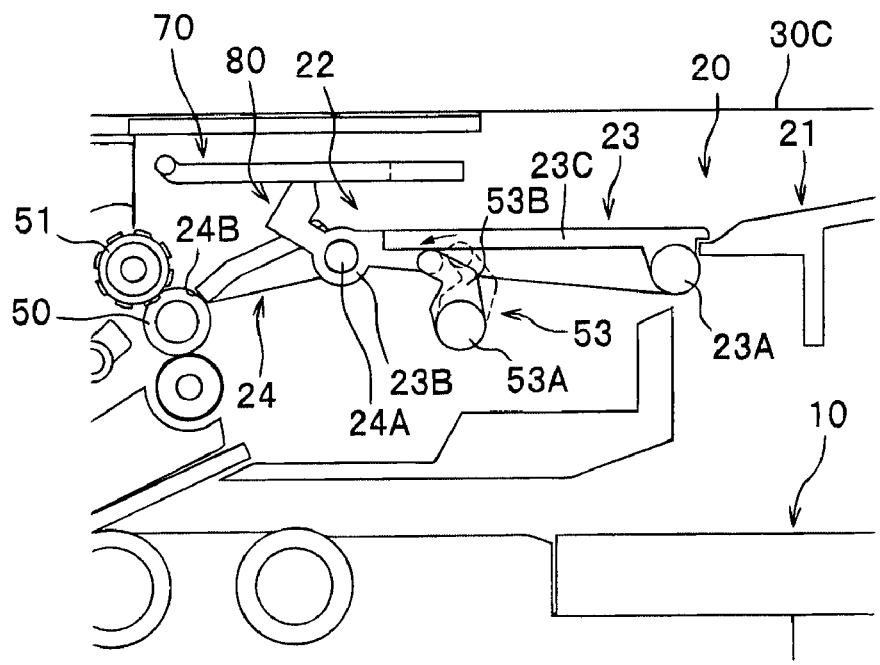
FIG. 11 is a partial cross-sectional view for explaining the operation of the pressing members and the document output tray.

In the second ejection mode, most of each retracting member 80 relatively protrudes upward from the upper surface of the second flap 24 as shown in FIG. 11 (due to downward pivoting of the second flap 24 with respect to the first flap 23) so as to push the pressing member 70 upward.

For ejecting the document, the switchback roller 50 is driven and rotated clockwise in FIG. 2, by which the document is fed between the switchback roller 50 and the pinch roller 51 and ejected to the document output tray 20.

The cams 53 are provided on both sides of the first flap 23 in the width direction as shown in FIG. 7. Each cam 53 is integrally formed by a shaft part 53A, a link part 53B and a push-up part 53C. The shaft part 53A, which is attached to the side panel 30C to be rotatable, is driven and rotated by driving force transmitted from the unshown motor. The link part 53B, for linking the shaft part 53A with the push-up part 53C, is substantially in parallel with the side panel 30C. The push-up part 53C is a substantially cylindrical part which extends inward in the width direction from the distal end of the link part 53B.

The cams 53 are rotated in a normal direction or in a reverse direction under control of a control unit 90 shown in FIG. 2, by which the flap part 22 are pivoted downward or upward so as to switch the document ejection mode between the first ejection mode and the second ejection mode. The cams 53, the flap part 22 and the retracting members 80 function as a retracting mechanism for retracting the pressing members 70 by pivoting them upward.

The control unit 90 (including a CPU (Central Processing Unit), ROM (Read Only Memory), RAM (Random Access Memory), etc.) is a unit for controlling the overall operation of the document feeding device 1. The document feeding device 1 is equipped with a selection unit 91 for letting the user select the single-side scan or the double-side scan, such as buttons, a touch screen or a sensor capable of detecting whether each document is a single-side document (printed on one side) or a double-side document (printed on both sides). Incidentally, the selection unit 91 may either be provided on the document feeding device 1 or on an image scanning device (scanner, MFP, copier, etc.) in which the document feeding device 1 is installed. The control unit 90 switches whether or not to use the aforementioned turnover mechanism (first guide member 61, etc.) by controlling the aforementioned switching drive mechanism and retracting mechanism (cams 53, etc.) based on the selection through the selection unit 91. Specifically, the control unit 90 determines to use the turnover mechanism when a double-side scan instruction is received (or not to use the turnover mechanism when a single-side scan instruction is received) from the user through the selection unit 91. When the control unit 90 determines to use the turnover mechanism, the control unit 90 controls the retracting mechanism so as to make the pressing members 70 press the stack of documents M on the document output tray 20 from above. In other words, when the double-side scan instruction is received, the control unit 90 pivots the flap part 22 downward and thereby switches the document ejection mode to the first ejection mode in which the documents M on the document output tray 20 can be pressed from above with the pressing members 70.

<Action and Effect>

Figure 9:
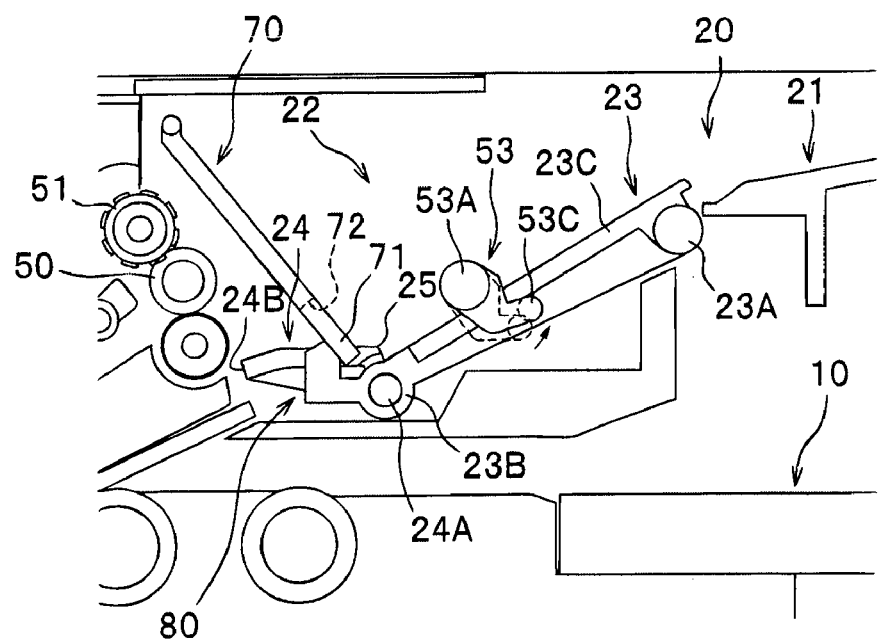
FIG. 9 is a partial cross-sectional view for explaining the operation of the pressing members and a document output tray of the document feeding device.
Figure 10:
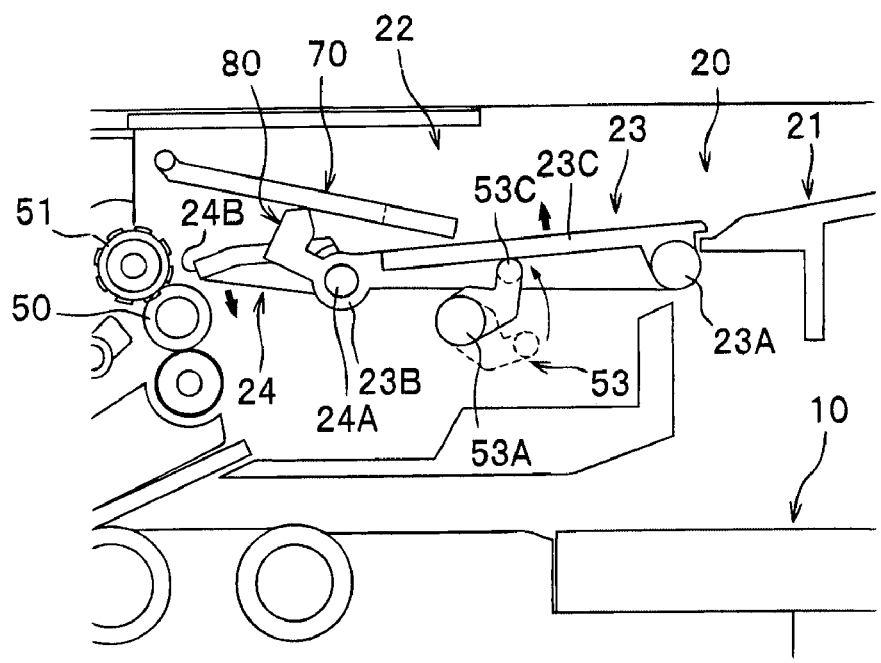
FIG. 10 is a partial cross-sectional view for explaining the operation of the pressing members and the document output tray.
Figure 12A:
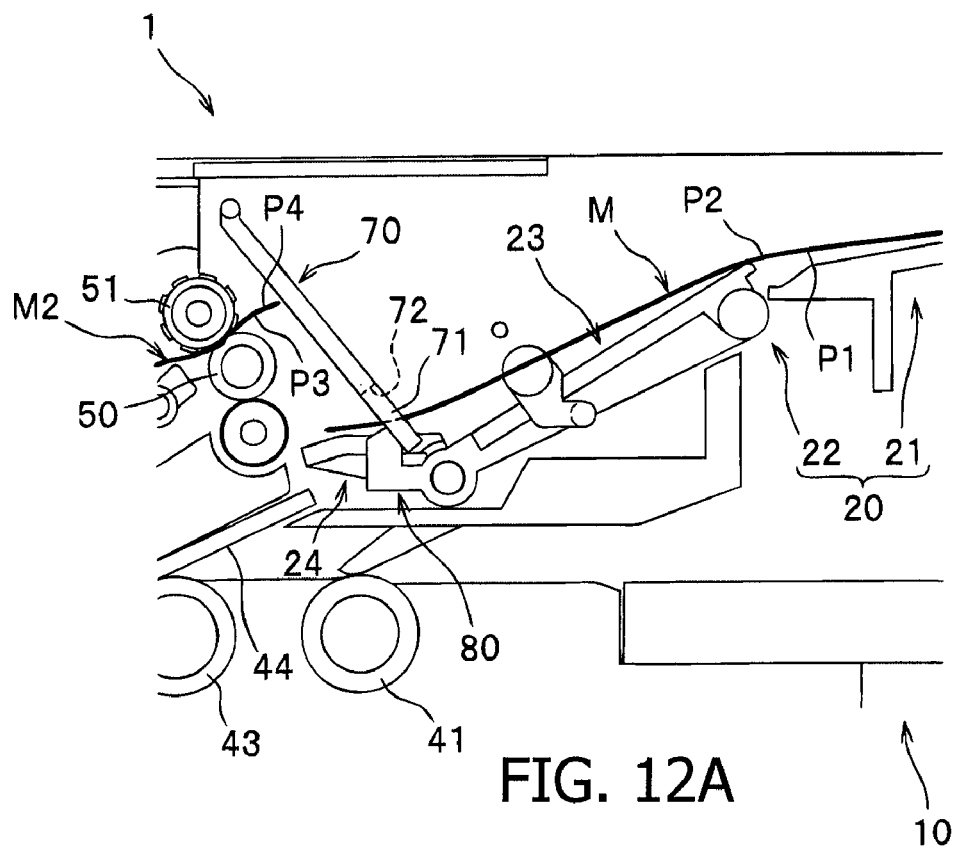
FIG. 12A is a cross-sectional view showing a state of the document feeding device in a first ejection mode.
Figure 12B:
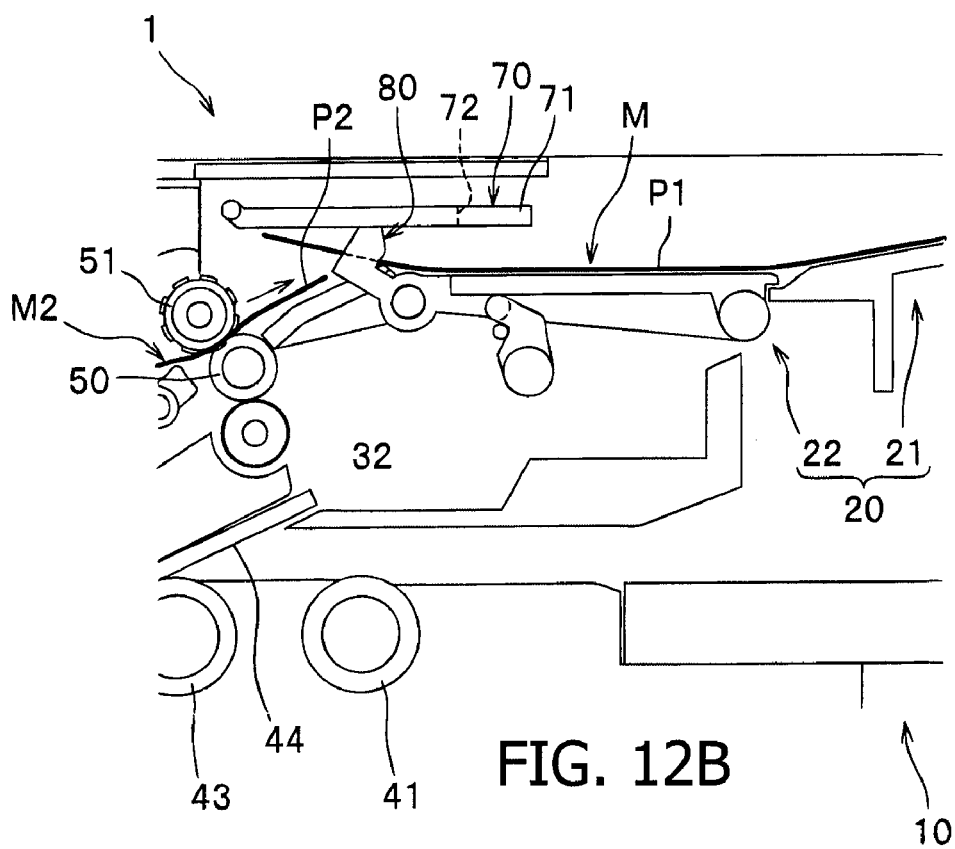
FIG. 12B is a cross-sectional view showing a state of the document feeding device in a second ejection mode.

The action and effect of the document feeding device 1 configured as above will be described below. FIGS. 9-11 are partial cross-sectional views for explaining the operation of the pressing members 70 and the document output tray 20 of the document feeding device 1. FIG. 12A is a cross-sectional view showing a state of the document feeding device 1 in the first ejection mode. FIG. 12B is a cross-sectional view showing a state of the document feeding device 1 in the second ejection mode.

In the first ejection mode (with the flap part 22 pivoted downward as shown in FIG. 9), each pressing member 70 is pointing obliquely downward due to its own weight, with its pushed part 71 making contact with the retracting member 80, by which the document contacting parts 72 of the pressing members 70 are placed at (in the vicinity of) the upper surface of the second flap 24. Thus, when the document M after undergoing the scanning is ejected to the document output tray 20 as shown in FIG. 12A, the pressing members 70 (pushed by the front end of the document M ejected from between the switchback roller 50 and the pinch roller 51) pivots downstream (upward), and the document M keeps on moving downstream along surfaces of the pressing members 70 and the document output tray 20. When the whole document M has been placed on the document output tray 20, the rear end part of the document M is pressed down by the document contacting parts 72 of the pressing members 70. Thus, the rear end of the document M (pressed down by the pressing members 70) can consistently be placed below the nipping position of the switchback roller 50 and the pinch roller 51 even when the document M has curl at its rear end, by which the front end of a document M2 ejected next is prevented from getting under the document M on the document output tray 20.

The document ejection mode is set to the above first ejection mode by the control unit 90 when the double-side scan instruction is inputted by the user. By setting the document ejection mode to the first ejection mode as above in the double-side scan (see FIG. 6), documents M are ejected to the document output tray 20 with their front scan target surfaces P1 facing downward and their back scan target surfaces P2 facing upward. Therefore, by ejecting the next document M2 (with its front scan target surface P3 facing downward and its back scan target surface P4 facing upward) while stacking it on the already ejected documents M, the documents M and M2 can be arranged in the normal order (with their scan target surfaces P1, P2, P3 and P4 arranged normally from below).

In order to switch the document ejection mode from the first ejection mode to the second ejection mode, the control unit 90 rotates the cams 53 counterclockwise in FIG. 9, by which the first flap 23 pivots upward and the second flap 24 pivots downward as shown in FIGS. 10 and 11 in sequence. In this case, the retracting members 80 (formed at the end of the first flap 23) gradually protrude relatively from the upper surface of the second flap 24 and push up the pressing members 70, by which the pressing members 70 are retracted from the upper surface of the flap part 22. Due to the downward pivoting of the second flap 24, the apex of the bent part 25 of the second flap 24 is placed above the upstream end 24B of the second flap 24, and the upstream end 24B is positioned substantially at the same level as the nipping position of the switchback roller 50 and the pinch roller 51.

Thus, when the document M after undergoing the scanning is ejected to the document output tray 20 as shown in FIG. 12B, the document M fed between the switchback roller 50 and the pinch roller 51 is ejected smoothly to the document output tray 20 without making contact with the pressing members 70. A document M2 ejected next is allowed to smoothly slide under the document M on the document output tray 20 since the rear end part of the already ejected document M is not pressed down by the pressing members 70. In this case, the sliding of the document M2 under the document M on the document output tray 20 is facilitated by the apex of the bent part 25 which supports the rear end part of the document M and thereby lifts the rear end of the document M from the second flap 24.

The document ejection mode is set to the above second ejection mode by the control unit 90 when the single-side scan instruction is inputted by the user. By setting the document ejection mode to the second ejection mode as above in the single-side scan (see FIG. 3), documents M are ejected to the document output tray 20 with their scan target surfaces P1 facing upward. Therefore, by ejecting the next document M2 (with its scan target surface P2 facing upward) while sliding it under the already ejected documents M, the documents M and M2 can be arranged in the normal order (with their scan target surfaces P1 and P2 facing upward).

As described above, the following effects can be achieved by this embodiment.

The pressing members 70 (for pressing down the rear end part of the documents M on the document output tray 20 in the first ejection mode) is pushed up by the retracting mechanism (retracting members 80, flap part 22, etc.) and thereby separates (retracts) from the upper surface of the flap part 22 in the second ejection mode. Thus, the documents M can be stacked up from the bottom consistently in the normal order (by preventing sliding of a document M under/into the stack) in the first ejection mode, while excellently realizing the sliding of each document M under the stack (by preventing the pressing members 70 from causing resistance hampering the sliding) in the second ejection mode. Therefore, the document ejection mode can be switched between the first ejection mode and the second ejection mode without deteriorating the document ejection performance of the document feeding device.

Since the pressing members 70 are pivoted up and down in conjunction with the vertical motion of the flap part 22, the rear end part of the stack of documents M on the document output tray 20 can be securely pressed down with the pressing members 70 in the first ejection mode in which the flap part 22 is placed at the lower position, while consistently separating (retracting) the pressing members 70 from the upper surface of the flap part 22 in the second ejection mode in which the flap part 22 is placed at the upper position.

Since the retracting members 80 sink below the upper surface of the second flap 24 in the first ejection mode, each document M can be smoothly ejected to the document output tray 20 without making contact with the retracting members 80 in the first ejection mode. Further, since the retracting members 80 are placed outside the document width, each document M can be smoothly ejected without making contact with the retracting members 80 even in the second ejection mode in which the retracting members 80 protrude from the upper surface of the second flap 24.

When the turnover mechanism is used, that is, in the double-side scan in which the switchback operation (for interchanging the front end and the rear end of the document M by switching the feeding direction) is carried out, the control unit 90 controls the switching drive mechanism and the retracting mechanism in the first ejection mode, by which the rear end part of the stack of documents on the document output tray 20 can consistently be pressed down with the pressing members 70. Incidentally, if the documents stacked up on the document output tray 20 are not pressed down by the pressing members 70, the height of the document stack increases (compared to the height in this embodiment) since the documents are stacked up via layers of air. Thus, when a document M sandwiched between the switchback roller 50 and the pinch roller 52 (immediately under the switchback roller 50) is switched back as shown in FIG. 5, the document M during the switchback operation can make contact with or slide into the stack of documents on the document output tray 20. In this case, the document M during the switchback operation can be bent or folded due to a load added thereto, by which the document M can be jammed between the switchback roller 50 and the pinch roller 52. Further, also when the document stack not pressed down by the pressing members 70 has curl at its rear end, the rear end can make contact with the document M during the switchback operation, by which the document M can be bent, folded and jammed. In order to prevent such problems, the pressing members 70 in this embodiment press down the stack of documents when the switchback operation is carried out, by which the air between the documents is removed and the height of the document stack is reduced, by which the document M being switched back is prevented from contacting/sliding with/into the document stack and the switchback operation is carried out smoothly and excellently. Further, in this embodiment, the curl at the rear end of the document stack can be removed by pressing down the document stack with the pressing members 70 when the switchback operation is carried out, by which the document M being switched back is prevented from making contact with the curled rear end of the document stack and the switchback operation is carried out smoothly and excellently.

The document M at the scanning position R is fed from the center to the downstream end of the platen glass G (from right to left in FIG. 3) as shown in FIG. 3, etc. in the document feeding device 1 of this embodiment. Thus, the platen glass G (scanning glass) of the document feeding device can be formed by a sheet of glass (transparent material). Suppose that the document M is fed in the opposite direction (from the left end toward the center of the platen glass G) in the configuration of FIG. 3, the document M shoots into a gap between the upper surface of the platen glass G and the lower surface of the document feeding device 1 and the feeding of the document M to the document output tray situated to the upper right (the document input tray 10 in this embodiment) becomes impossible. Thus, in cases where the document M is fed in the opposite direction (opposite to the feeding direction in FIG. 3), the platen glass G has to be separated into two at a position to the right of the scanning position R and a sloped surface (with its lower end situated slightly below the upper surface of the platen glass G and its upper end situated to the upper right) has to be provided between the two sheets of platen glass G so that the document M can be fed to the document output tray situated to the upper right without letting the document M shoot into the gap between the upper surface of the platen glass G and the lower surface of the document feeding device 1. While the platen glass G has to be separated into two in cases where the document M is fed in such a direction (opposite to that in FIG. 3), the document M is fed in the feeding direction shown in FIG. 3 in the document feeding device 1 of this embodiment, by which the platen glass G can be formed by a sheet of glass (transparent material) and the document scanner can be downsized. Consequently, miniaturization of the device (scanner, MFP, copier, etc.) in which the document feeding device 1 is installed can be realized.

While a description has been given above of a preferred embodiment in accordance with the aspects of the present invention, the invention is not to be restricted by the particular illustrative embodiment and a variety of modifications, design changes, etc. are possible without departing from the scope and spirit of the invention described in the appended claims.

For example, while the nipping position of a pair of ejection rollers (the switchback roller 50 and the pinch roller 51 immediately above the switchback roller 50) and the position of the upstream end of the document output tray 20 are moved relatively in the vertical direction by pivoting the flap part 22 up and down in the above embodiment, the relative movement may be implemented in different ways. For example, it is also possible to relatively move the nipping position of the pair of ejection rollers and the upstream end position of the document output tray in the vertical direction by moving the pair of ejection rollers up and down.

While two retracting members 80 are placed outside the width of the document M in the above embodiment, it is also possible to place only one retracting member 80 on one side, place one or two retracting members 80 within the width of the document M, etc.

While the retracting mechanism for retracting the pressing members 70 is made up of the retracting members 80, the flap part 22, the cams 53, etc. in the above embodiment, the retracting mechanism may be configured differently. For example, the retracting mechanism can also be implemented by use of a gear mechanism for transmitting torque from the pivot shaft of the flap part to the pivot shaft of the pressing members. Also in this case, the flap part and the pressing members can be moved in conjunction with each other. The conjunctive movement of the flap part and the pressing members may also be implemented by methods other than such mechanical conjunctions. For example, the conjunctive movement can be implemented by using separate drivers for the pivoting of the flap part and the pressing members and properly controlling the drivers.

While the sinking/protruding action of the retracting members 80 relative to the upper surface of the flap part (i.e. the upper surface of the second flap 24) is implemented in the above embodiment by forming the retracting members 80 integrally with the first flap 23 and allowing the second flap 24 to pivot with respect to the first flap 23, the sinking/protruding action of the retracting members may be implemented differently. For example, the action of the tips (upper ends) of the retracting members pivoting downward and sinking below the upper surface of the flap part can also be implemented by providing the retracting members to be pivotable with respect to the flap part, biasing the retracting members with elastic members (e.g. springs) to let the tips of the retracting members constantly protrude from the upper surface of the flap part, and letting proximal ends of the retracting members make contact with parts of the housing (supporting the flap part) when the flap pivots downward.

While the pressing members 70 in the above embodiment are configured to press down the rear end part of the document stack with their own weight, the pressing members may be configured differently. For example, the pressing members may be equipped with biasing members for constantly biasing them downward. In this case, the biasing force of the biasing members is set properly so that the pressing members can pivot upward when pressed by the front end of the document M being ejected by the switchback roller 50.

While the document output tray 20 is placed above the document input tray 10 in the document feeding device 1 of the above embodiment, the positional relationship of the trays 10 and 20 is not particularly restricted; the aspects of the present invention are applicable also to configurations in which the document output tray is placed below the document input tray.

The configuration of the feeding mechanism and the turnover mechanism described in the above embodiment is just an example, and thus the configuration (e.g. the number, arrangement, etc. of the rollers) can be changed properly as needed. It is also possible to employ a pinch roller instead of each pad. In short, the configuration, employed members, etc. of the feeding mechanism and the turnover mechanism may be changed properly without departing from the scope and spirit of the present invention.

The configuration of the feeding path 31 and the turnover path 32 described in the above embodiment is just an example, and thus the configuration is not to be restricted to that in the above embodiment. In other words, the configuration of the feeding path 31 and the turnover path 32 (or the configuration of the feeding mechanism and the turnover mechanism) may be changed properly depending on the positional relationship between the document input tray and the document output tray, the shape, size, etc. of the document feeding unit, etc.

What is claimed is:

1. A document feeding device for feeding documents, comprising:
    a document input tray on which documents to be fed are placed;
    a document output tray to which the documents are ejected;
    a feeding mechanism which is provided for a feeding path connecting the document input tray and the document output tray via a scanning position and feeds each document from the document input tray to the scanning position and from the scanning position to the document output tray;
    a turnover mechanism which is provided for a turnover path connected to the feeding path and returns the document after passing through the scanning position to a position on the upstream side of the scanning position while interchanging the front end and the rear end of the document in a feeding direction;
    a pair of ejection rollers which ejects each document to the document output tray;
    an ejection mechanism which switches between a first ejection mode for successively ejecting each document while stacking the ejected document on documents previously ejected to the document output tray and a second ejection mode for successively ejecting each document while sliding the ejected document under the documents previously ejected to the document output tray by relatively moving a nipping position of the pair of ejection rollers and an upstream end, in a feeding direction, of the document output tray in a vertical direction;
    a pressing member which is configured to pivot up and down on the downstream side of the pair of ejection rollers in the feeding direction and which presses down the ejected documents on the document output tray from above in the first ejection mode; and
    a retracting mechanism which retracts the pressing member by pivoting the pressing member upward in the second ejection mode.

2. The document feeding device according to claim 1, wherein:
    the document output tray includes a tray part and a flap part which is attached to the tray part to be pivotable up and down on the upstream side of the tray part in the feeding direction, and
    the retracting mechanism retracts the pressing member by pivoting the pressing member upward when the flap part pivots upward.

3. The document feeding device according to claim 2, wherein:
    the retracting mechanism includes a retracting member which relatively protrudes from an upper surface of the flap part when the flap part has pivoted upward in the second ejection mode while relatively sinking below the upper surface of the flap part when the flap part has pivoted downward in the first ejection mode, and
    the retracting member makes contact with the pressing member and thereby retracts the pressing member when the flap part pivots upward for the second ejection mode.

4. The document feeding device according to claim 3, wherein the retracting member is placed outside the width of the document in a direction orthogonal to the feeding direction.

5. The document feeding device according to claim 4, further comprising a control unit which controls the retracting mechanism based on selection made through a selection unit regarding whether or not to use the turnover mechanism,
    wherein when the use of the turnover mechanism is selected through the selection unit, the control unit sets the pressing member in a state in which the pressing member is configured to press down the previously ejected documents on the document output tray from above by controlling the retracting mechanism.

6. The document feeding device according to claim 1, further comprising a control unit which controls the retracting mechanism based on selection made through a selection unit regarding whether or not to use the turnover mechanism, wherein when the use of the turnover mechanism is selected through the selection unit, the control unit sets the pressing member in a state in which the pressing member is configured to press down the previously ejected documents on the document output tray from above by controlling the retracting mechanism.

* * * * *